United States Patent [19]

Blakely et al.

[11] Patent Number: 4,848,934
[45] Date of Patent: Jul. 18, 1989

[54] LIGHTWEIGHT HIGH PERFORMANCE TITANIUM SLIDING CONTACT BEARING

[75] Inventors: Lawrence A. Blakely; Rodney R. Boyer, both of Issaquah; Lawrence B. Dalzell, Edmonds, all of Wash.

[73] Assignee: The Boeing Company, Seattle, Wash.

[21] Appl. No.: 690,754

[22] Filed: Jan. 11, 1985

[51] Int. Cl.$^4$ ............................................. F16C 33/04
[52] U.S. Cl. ................................... 384/206; 384/297; 384/625; 384/912; 384/913
[58] Field of Search ............... 384/206, 297, 213, 912, 384/907, 625, 208, 913; 308/241

[56] References Cited

U.S. PATENT DOCUMENTS

| | | | |
|---|---|---|---|
| 2,853,346 | 9/1958 | Spangenberg | 384/213 |
| 2,934,480 | 4/1960 | Slomin | 204/37 |
| 3,143,383 | 8/1964 | Bamberger et al. | 308/241 |
| 3,297,552 | 1/1967 | Gisser et al. | 204/37 |
| 3,391,287 | 6/1975 | Vogt . | |
| 3,418,028 | 12/1968 | Watson et al. | 308/241 |
| 3,442,561 | 5/1969 | Henry-Biabaud | 384/213 |
| 3,641,990 | 2/1972 | Kinnersly | 123/196 R |
| 3,724,919 | 4/1973 | Lagally et al. . | |
| 4,043,623 | 8/1977 | Rausch et al. | 384/220 |
| 4,309,474 | 1/1982 | Hodes et al. | 428/328 |

FOREIGN PATENT DOCUMENTS

| | | |
|---|---|---|
| 541580 | 12/1941 | United Kingdom . |
| 1023007 | 3/1966 | United Kingdom . |

Primary Examiner—Lenard A. Footland
Attorney, Agent, or Firm—Delbert J. Barnard

[57] ABSTRACT

A combination of a sliding-contact race (12) and bearing (10) in which a generally ring-shaped race member (12) and a generally ring-shaped bearing member (10) are fitted for relative sliding-rotation, the bearing member being within the race member. One of the members is comprised substantially of copper and the other of the members is comprised substantially of titanium. The members (10, 12) have lubricated contact surfaces (16, 18) for sliding-rotation, the member being comprised substantially of titanium having its lubricated contact surface being coated with chromium oxide (16).

18 Claims, 2 Drawing Sheets

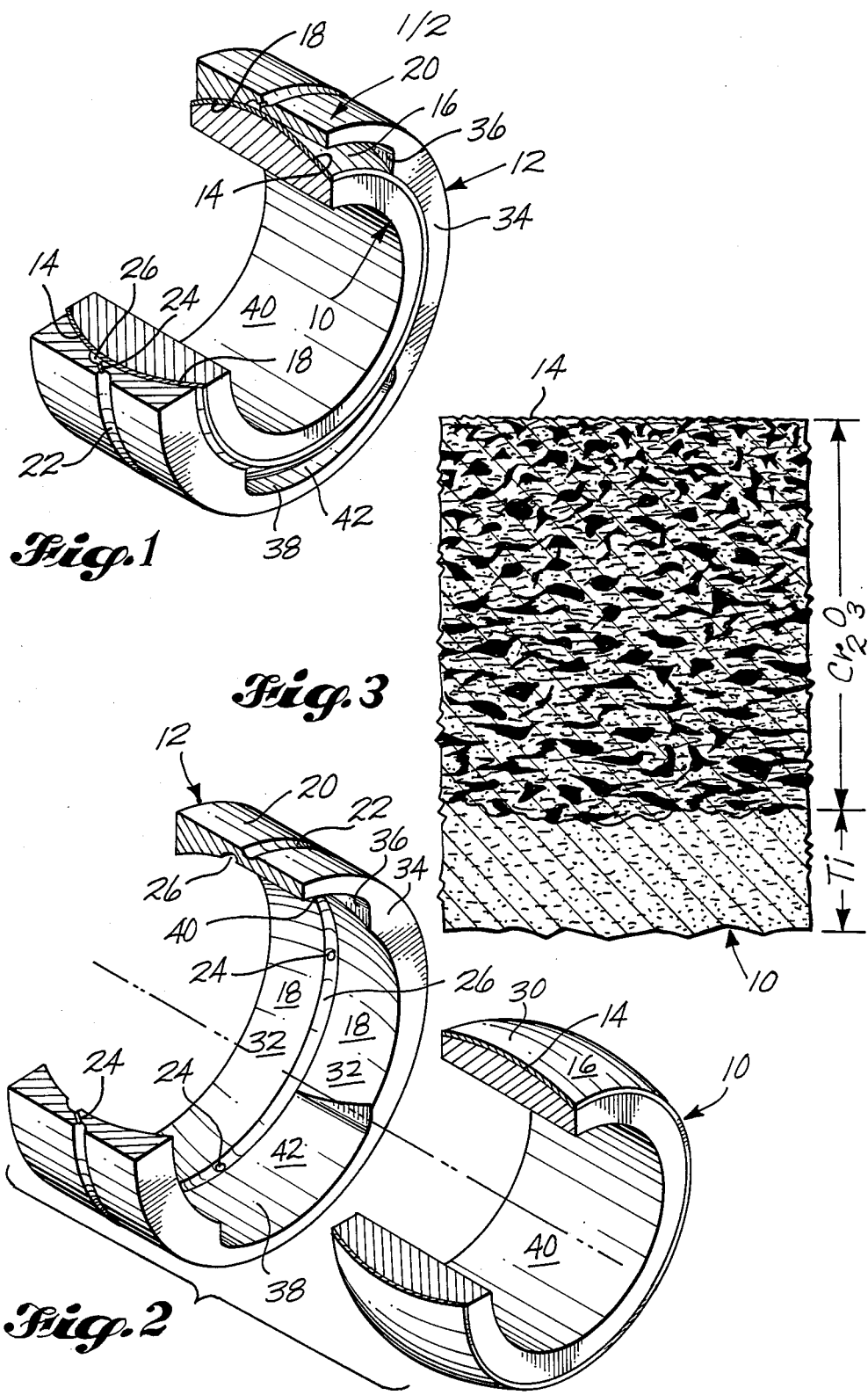

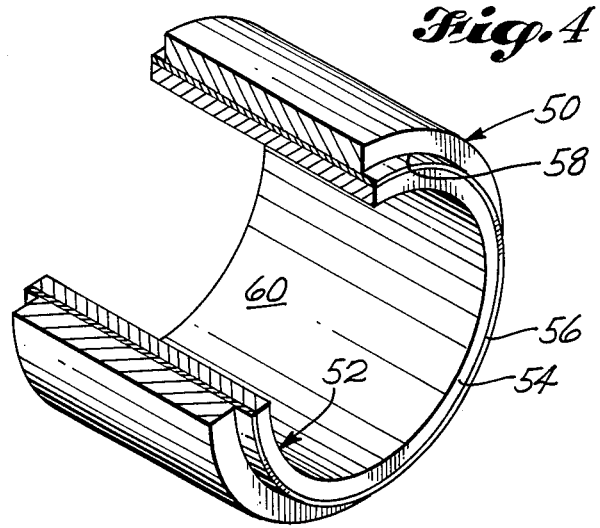
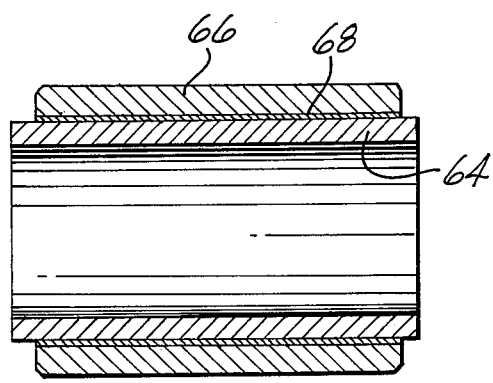
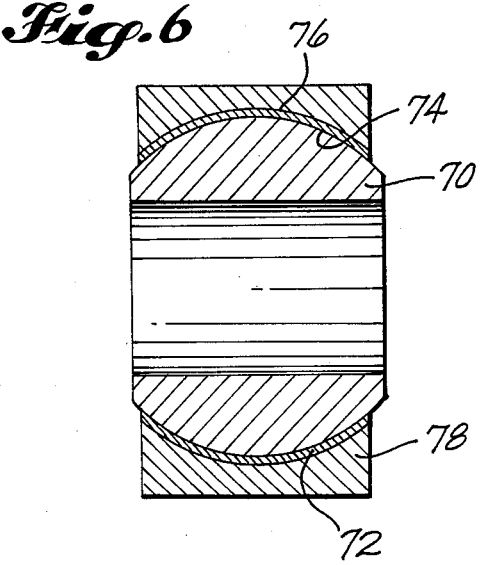

LIGHTWEIGHT HIGH PERFORMANCE TITANIUM SLIDING CONTACT BEARING

TECHNICAL FIELD

The invention relates to lightweight high performance bearings for use in aircraft in which titanium coated with chromium oxide is employed as one of the members used in sliding contact with a copper second member.

BACKGROUND ART

Prior art sliding contact bearings in aircraft have presented excessive weight and poor overall performance problems. Sliding bearings used in landing gear, for example, are relatively large and take a substantial load. Weight reduction in such bearings can only be achieved by substituting lower density or more efficient materials, that is, smaller bearing envelopes.

Many of the present bearings are made of steel and are very heavy compared with titanium, for example. Titanium is a very desirable metal because of its lightweight but it had not been used successfully in metal-to-metal sliding surface contact due to severe galling problems. In the prior art no coatings or lubricants had been developed to solve this metal-to-metal bearing problem.

Chromium oxide coating has been used on titanium spherical bearings with a Teflon coated race in hydrofoil applications and in the wing pivot bearing on an F-14 airplane. Although chromium oxide is known to be brittle, it has been found to be satisfactory as a coating and used in a Teflon race because the lubrication is permanent and in situations where there are no significant shock loads which would tend to chip the brittle chromium oxide. That is, there is no risk of losing lubrication with a Teflon race but in situations where a bearing could become grease starved or subject to shock loads, it was considered that chromium oxide would not be a satisfactory coating for titanium or other metals when used against a metal race, including copper or copper alloys. Landing gear trunnion bearings on a large airplane obviously take significant shock loads and, therefore, it was considered that chromium oxide would be too brittle to be used as a coating on a titanium bearing, the titanium being considered primarily as a weight saving material in contrast to the steel bearings being used.

A search of the patent literature discloses the use of titanium bearings. For example, U.S. Pat. No. 3,724,919 teaches the use of a titanium allow for a low friction, seawater-lubricated bearing in conjunction with a high density polyethylene race, but did not suggest the use of chromium oxide as a coating for titanium.

U.S. Pat. Nos. 4,309,474; 4,043,623 and British Pat. No. 1,023,007 teach the use of chromium oxide as a surface coating for bearing surfaces but titanium was not one of the alloys included in these patents.

The following patents disclose subject matter of general interest:
U.S. Pat. No. 2,934,480 Slomin,
U.S. Pat. No. 3,143,383 Bamberger et al,
U.S. Pat. No. 3,297,552 Gisser et al,
U.S. Pat. No. 3,418,028 Watson et al,
U.S. Pat. No. 3,391,287 Vogt,
No. 541,580 Great Britain.

DISCLOSURE OF THE INVENTION

The invention is the combination of a sliding contact bearing and race in which the bearing or race may be made of titanium or a titanium alloy coated with plasma-sprayed chromium oxide, $Cr_2O_3$, and in which the other member may be made of copper or a copper alloy. In the combination the chromium oxide on the titanium slides against the copper surface generally in the form of a journal bearing arrangement.

Bearings, according to the invention, are typically ring-shaped and comprised of a titanium alloy and having an outer circumferential bearing surface coated with chromium oxide. The race is also generally ring-shaped and is substantially comprised of copper or a copper alloy. The race has an inner generally circumferential surface complementary to the coated surface of the bearing and the bearing is fitted within the race so that the complementary surfaces are positioned for relative sliding-rotation so that the chromium oxide makes bearing contact with the inner circumferential copper, the copper and chromium oxide being lubricated. The bearing and complementary surface in the race may be cylindrical or may be spherical.

It has been found that the use of bearings, according to the invention, in a main landing gear forward trunnion support structure in a large aircraft permits about a 40% weight savings in comparison with steel bearings.

Further advantages of the invention may be brought out in the following part of the specification wherein small details have been described for the competence of the disclosure without intending to limit the scope of the invention which is set forth in the appended claims.

BRIEF DESCRIPTION OF THE DRAWING

Referring to the accompanying drawings which are for illustrative purposes:

FIG. 1 is a cutaway pictorial view of a spherical bearing and race according to the invention;

FIG. 2 is an exploded view of the bearing and race shown in FIG. 1;

FIG. 3 is a fragmentary view of a plasma-sprayed chromium oxide coating on a titanium alloy spherical bearing, as shown in FIG. 2, magnified 500 times;

FIG. 4 is a cutaway view of a cylindrical bearing and race according to the invention;

FIG. 5 is a cross-sectional view of a cylindrical bearing and race in which the race is made of titanium and has its inner circumferential surface coated with chromium oxide and the bearing is made of copper; and FIG. 6 is a cross-sectional view of a spherical bearing in which the race is made of titanium and has its inner circumferential surface coated with chromium oxide and the bearing is made of a copper alloy.

BEST MODE FOR CARRYING OUT THE INVENTION

Referring again to the drawings, there are shown in FIGS. 1 and 2 cutaway views of slotted-entry, spherical sliding ball bearings 10 and complementary races 12. The bearings 10 are ring-shaped and are made of titanium or of a titanium alloy. They have an outer circumferential surface 14 coated with chromium oxide 16. As shown in Fig. 1, the bearing is fitted within the race 12 which has an inner circumferential surface 18, complementary to the circumferential surface 16 on the bearing.

The outer surface 20 of the race is generally cylindrical and has an annular groove 22 through which extend a plurality of grease passages 24, the passages terminating inwardly in an inner circumferential groove 26 for supplying a continuous coating of grease to the interior of the race at 32 and to the outer circumferential surface of the bearing at 30. The race 12 is made of copper or a copper alloy.

For insertion of the bearing into the race on one side 34 of the race, there are diametrically-spaced slots or grooves 36 and 38, formed so as to be wider than the bearing along its center line, the slots having their outer bottoms 40 and 42 spaced diametrically apart so that distance between them at the race side 34 is greater than the largest diameter of the spherical circumference of the bearing. The slots decrease in depth as they extend inwardly into the race along the direction of its centerline and terminate at the groove 24 so that the distance of the groove 24 is greater from the side 34 than the groove 24 is for the opposite side of the race. Thus, to insert the bearing into the slot, it is positioned so that it can be moved into the slots, that is, with a plane through the bearing and perpendicular to its centerline, positioned perpendicular to a plane perpendicular to the centerline of the race. After the bearing is thus moved inwardly into the race, until it is stopped by the circumferential surface of the bearing spaced away from the slots, the bearing may be then rotated in the race 90°, and it is then held within the bearing by the smaller diameter edges along the opposite flat sides of the race. Inner circumferential surface 40 of the bearing is adapted to be fitted on a journal for rotation therewith or relative thereto.

In FIG. 3 there is a fragmentary cross-sectional view of a bearing 10 made of titanium or a titanium alloy on which a coating of chromium oxide 14 has been plasma-sprayed and which is shown to be mechanically bonded to the titanium. The view is magnified 500 times and the dark spots in the chromium oxide are small holes.

The bearing may be titanium or any common titanium base alloy in which the titanium weight is at least 70%. Well-known titanium alloys such as the following have been used, according to the invention, the amounts being shown by weight:

about 85% Ti, about 10% V, about 2% Fe, and about 3% Al;
about 90% Ti, about 6% Al, and about 4% V; and
about 86% Ti, about 6% Al, about 6% V, and about 2% Sn.

In the race pure copper or any copper base alloy in which the copper weight is at least 80% can be used. In addition, the race can be made of aluminum bronze containing by weight:

about 91% Cu, about 7% Al, and about 2% Fe;
aluminum nickel bronze containing by weight about 81% to 88% Cu, about 9% to 15% Al, and about 4% Ni; and
beryllium-copper containing by weight about 98% Cu, about 2% Be, and traces of Fe and Ni.

In FIG. 4 a cylindrical race 50 made of copper or a copper alloy has a cylindrical journal bearing 52 made of titanium or a titanium alloy 54 and has a plasma-sprayed chromium oxide coating 56. The cylindrical coating 56 is adapted to be slidably engaged in the inner cylindrical surface 58 of the race, the bearing having an inner cylindrical surface 60 adapted to fitted on a journal. The inner surface of the race and the outer surface of the bearing are grease lubricated by any conventional manner, as shown in FIGS. 1 and 2.

In FIG. 5 an inner cylindrical bearing 64 is made of copper or a copper alloy, and an outer race 66 is made of titanium or a titanium alloy and has its inner cylindrical surface plasma-sprayed with chromium oxide to form a coating 68 for slidable and rotational contact with the bearing 64.

In FIG. 6 still another embodiment of the invention is shown in which a copper or copper alloy bearing 70 has an outer spherical circumferential surface 72 in sliding bearing contact with a complementary internal spherical surface 74 formed of a coating of chromium oxide plasma-sprayed on an inner spherical surface 76 of a titanium or titanium alloy race 78.

The alternate embodiments in FIGS. 5 and 6 are grease lubricated between the bearing and race and the copper and titanium alloys may be the same as those described with respect to FIGS. 1 and 2.

TESTS

One inch diameter bore, high-strength Ti alloy spherical balls, namely, 85Ti-10V-2Fe-3Al (numbers indicate percentages by weight), were fabricated and installed in slotted-entry Be-Cu races, as seen in FIGS. 1 and 2. These bearings were tested in dynamic cyclic wear tests and fatigue tests to simulate the jarring action or shock loading a bearing may experience. Chromium plated stainless steel spherical balls, of the same shape as shown in FIGS. 1 and 2, were tested in the same type of Be-Cu races, which are a more or less standard aircraft bearing combination.

Under severe conditions, that is, grease-starved condition or ingestion of contaminated grease, the chromium oxide on the Ti balls, according to the invention, were much superior to the stainless steel bearings, as indicated in Table 1 below.

An outstanding result occurred in a test where the bearing was lubricated at the start of a dynamic cyclic wear test with no additional grease added through the duration of the test of 100,000 cycles. A cycle generally consists of a plus and minus 20° oscillation at various bearing stresses starting with 6 ksi., which are typical service conditions for a forward trunnion bearing on a landing gear of a large commercial airplane. The torque had reached a maximum and was decreasing at the conclusion of the test. This data, and examination of the bearing, indicating that the bearing was still functional after 100,000 cycles.

The dynamic cyclic wear tests were conducted at 15 cycles/minute with a plus and minus 20° oscillation, as stated. The required grease lubrication cycles were established by monitoring the torque and temperature of the bearings during initial testings. Tests were performed using clean and contaminated MIL-G-23827 grease.

The tension-compression fatigue tests assess the ability of brittle coatings to withstand some of the jarring action that may be encountered by spherical bearings. The test loads started with those experienced by typical trunnion support bearings and then were raised to higher stresses.

Four titanium bearings, according to the invention, plasma-sprayed with chromium oxide coating and four 15-5 PH steel bearings, chromium plated, were tested. The test results are shown in Table I.

Bearing No. 1 was tested to 100,000 cycles at 6 ksi. bearing stress with no wear on the spherical ball and minimal wear on the race (periodic lubrication was performed every 900 cycles). The torque decreased over 50% from the start to the end of the test, indicating that no seizing was occurring. Bearing No. 2 was tested to 1720 cycles under the same conditions as above. The bearing stress was then increased 50% to 9 ksi. The testing result after 100,000 cycles was the same as for number 1, that is, no wear on the ball and minimal wear on the race. The torque this time decreased from 2925 to 1027 in.-lb. from the beginning to the end of the test.

The number I chromium-plated 15-5 PH steel bearing was tested at 9 ksi. with the same results. It started out with a lower torque value, 2002 in.-lb., but after 100,000 cycles had the same torque value as the titanium number 2 with chromium oxide coating. In comparing the chromium oxide coated titanium bearing, number 2, with the number I steel bearing, there was no wear on the former and there was minimal wear on its race but on the chromium plated steel bearing there was copper pick-up on the chromium plating.

In order to examine the effect of contaminants on the chromium oxide coating, the number 3 titanium bearing was subjected to the same test conditions, as above, at 6 ksi. with contamination introduced to simulate particles ingestion possible in actual service conditions. The bearing was lubricated normally every 900 cycles, but on every fourth lubrication cycle it was lubricated with grease containing 10% by volume of road dust per MIL-E-5272. In addition there was a constant drip of deicing fluid per MIL-A-8243 diluted with 50% water. The result for the number 3 bearing was the same as for the number 1 and 2 without contaminant, no wear on the ball, except that the final torque after the test was about 488 in.-lb. The steel bearings II and III were tested to 100,000 cycles in the same manner. They had somewhat higher torque at the end, 735 and 754 in.-lb. The chromium plate on the steel balls was torn in spots, and extensive wear of the races was observed.

The above titanium bearings with the plasma-sprayed chromium oxide coating were rotated to load the opposite ball and race surfaces. In the Table they are marked 1*, 2*, and 3*. Bearing test No. 1* was the same as for No. 1 to verify the excellent results from the previous contamination test. The results were the same as for the first test but the torque values were lower as shown on the Table. The bearing stress for No. 2* was increased to 13 ksi., the maximum allowable for grease lubricated bearings. The bearing was lubricated with clean grease every 900 cycles. The temperature build-up resulting from the friction between the ball and race with this loading was sufficient to discolor the outer race. After 100,000 cycles no noticeable wear was observed on the ball. In the test of No. 3* the loading was dropped back to 6 ksi., but the ball was only lubricated at the start of the test. No significant wear was observed on the ball after 100,000 cycles but minor pitting of the coating had occurred.

The chromium plated stainless steel bearings did not perform as well as the plasma-sprayed chromium oxide titanium balls under the more severe test conditions. Two contaminated grease tests, bearings II and III, survived 100,000 cycles but the chromium plating was worn off in areas. The chromium plating was also worn through extensively on test bearing No. IV which was only lubricated at the start of the test comparable to titanium bearing No. 3*. The test was stopped after about 80,000 cycles as the high torque was wearing out the drive sockets of the test machine. The maximum torque was about 86% higher than the flame-sprayed chromium oxide for the comparable test for No. 3*.

The durability of the brittle ceramic chromium oxide coating was a matter of concern before testing. One titanium ball, No. 4, was subjected to tension-compression fatigue tests to observe its behavior under this jarring action. The starting point stress cycle was $+5$ to $-1$ ksi., which is the maximum stress that the candidate trunnion bearing would experience. All testing was done at 30 $H_Z$ using sine-wave loading. The bearings were inspected after 150,000 cycles of test and showed no visible damage. Then the loads were incrementally increased by 50% and tested another 150,000 cycles. Testing was terminated at $+20$ ksi. to $-4$ ksi. with no damage. After that, the No. 4 ball was dynamic cyclic wear tested at the same condition as the No. 1 to 100,000 cycles. There was no wear found on the titanium balls.

In FIG. 3 the plasma-sprayed chromium oxide is on an 85Ti-10V-2Fe-3Al alloy ball. The thickness of the coating is about 120-170 microns. No evidence of oxygen diffusion in the base metal was found. The tests are compiled in Table I below.

TABLE I

| Bearing No. | Spherical Ball Material | Coatings on the ball | Bearing stress (psi) | Contamination in lubricant | Torque (in-lb) At 100 Cycles | Torque (in-lb) At end of test | Cycles | Comments |
|---|---|---|---|---|---|---|---|---|
| 1. | 85Ti—10V—2Fe—3Al** | Plasma-sprayed $Cr_2O_3$ Coating | 6000 | None | 2295 | 1027 | 100,000 | No wear on ball Minimal wear on outer race |
| 2. | 85Ti—10V—2Fe—3Al | Plasma-sprayed $Cr_2O_3$ Coating | 9000 | None | 2925 | 1027 | 100,000 | Same as above |
| 3. | 85Ti—10V—2Fe—3Al | Plasma-sprayed $Cr_2O_3$ Coating | 6000 | Yes | 3218 | 488 | 100,000 | No wear on ball |
| 4. | 85Ti—10V—2Fe—3Al | Plasma-sprayed $Cr_2O_3$ Coating | 6000 | Yes | 1612 | 293 | 100,000 | No wear on ball |
| 1.* | 85Ti—10V—2Fe—3Al | Plasma-sprayed $Cr_2O_3$ Coating | 6000 | Yes | 1196 | 806 | 100,000 | No wear on ball |
| 2.* | 85Ti—10V—2Fe—3Al | Plasma-sprayed $Cr_2O_3$ Coating | 13000 | None | 2438 | 1268 | 100,000 | No wear on ball Outer race shows high temperature discoloration |
| 3.* | 85Ti—10V—2Fe—3Al | Plasma-sprayed $Cr_2O_3$ Coating | 6000 | None | 488 | 1365 | 100,000 | Minor Copper pick-up on ball. Only greased at start of test. |

TABLE I-continued

| Bearing No. | Spherical Ball Material | Coatings on the ball | Bearing stress (psi) | Contamination in lubricant | Torque (in-lb) At 100 Cycles | Torque (in-lb) At end of test | Cycles | Comments |
|---|---|---|---|---|---|---|---|---|
| I. | 15-5 PH Steel | Chromium-plated | 9000 | None | 2002 | 975 | 100,000 | No wear on ball, minor copper pick-up on ball |
| II. | 15-5 PH Steel | Chromium-plated | 6000 | Yes | 1222 | 735 | 100,000 | Wear thru chromium plate, minor copper pick-up on ball |
| III. | 15-5 PH Steel | Chromium-plated | 6000 | Yes | 780 | 754 | 100,000 | Wear thru chromium plate, minor copper pick-up on ball |
| IV. | 15-5 PH Steel | Chromium-plated | 6000 | No | 734 | 2002*** | 80,026 | greased only at start chromium plate worn through, Cu pick-up on ball, extensive wear of race. |

**Numbers indicate percentages by weight
***Max. torque was 2535 in-lb.

TEST CONCLUSIONS

The plasma-sprayed chromium oxide coating on titanium provided a very good wear resistance. The testing results obtained were as good as or better than those obtained from chromium-plated 15-5 PH spherical bearings. The plasma-sprayed chromium oxide bearings were superior to the chromium plated 15-5 PH bearings in the contamination test and the test where the bearing was lubricated only at the start of the test. No damage was evident on the titanium bearing, but the chromium plate was worn through in areas on the steel ball.

A fatigue test made after those shown in Table I of a titanium bearing, according to the invention, on a main landing gear forward trunnion support structure on a large airplane demonstrated the viability of using titanium spherical bearings with a plasma-sprayed chromium oxide coating in air frame applications. Use of titanium in place of steel would permit about a 40% weight savings.

The invention and its attendant advantages will be understood from the foregoing description and it will be apparent that various changes made be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. The combination of contacting sliding-rotation bearing members forming a bearing having the capability to receive high loads relative to the members' weight and having the capability to withstand high shock loads, without a permanently fixed lubricant between or in the members, comprising:
   a first bearing member containing a sufficient amount of Ti by weight to form a heavy duty bearing member; and
   a second bearing member containing a sufficient amount of Cu by weight to form a heavy duty bearing member;
   said first member having surface coated with plasma-sprayed $Cr_2O_3$, the $Cr_2O_3$ coating being bonded mechanically to the Ti;
   said $Cr_2O_3$ coating being in sliding-rotation bearing contact with a surface of said Cu.
2. The invention according to claim 1 in which:
   said first member being an outer bearing race;
   said $Cr_2O_3$ coating being on an internal circumferential surface of said first member;
   said second member being a ring-shaped bearing;
   said second member being fitted within said first member for relative sliding-rotation so that said Cu makes bearing contact with said $Cr_2O_3$.
3. The invention according to claim 2 in which:
   said bearing contact between said Cu and said $Cr_2O_3$ is grease lubricated.
4. The invention according to claim 1 in which the Cu is in an alloy selected from the group consisting of:
   aluminum bronze containing by weight 91% Cu, 7% Al, and 2% Fe;
   aluminum nickel bronze containing by weight about 81% to 88% Cu, about 9% to 15% Al, and 4% Ni;
   beryllium-copper containing by weight 98% Cu, 2% Be, and traces of Fe and Ni; and
   any common Cu base alloy in which the Cu weight is at bearing;
   said bearing being fitted within said race so that said complementary surfaces are positioned for relative sliding-rotation so that said $Cr_2O_3$ makes bearing contact with said inner circumferential Cu, said last Cu and said $Cr_2O_3$ being grease lubricated.
5. The invention according to claim 1 in which:
   said first member being a ring-shaped bearing;
   said $Cr_2O_3$ coating being on an outer circumferential surface of said first member;
   said second member being an outer bearing race;
   said first member being fitted within said second member for relative sliding-rotation so that said $Cr_2O_3$ makes bearing contact with said Cu.
6. The invention according to claim 5 in which:
   said bearing contact between said $Cr_2O_3$ and Cu is grease lubricated.
7. The invention according to claim 1 in which:
   said first member is a ring-shaped bearing having an outer spherical circumferential bearing surface;
   said $Cr_2O_3$ coating being on said spherical surface;
   said second member being an outer bearing race;
   said second member having complementary spherical surfaces to receive the spherical surface of said first member;
   said first member being fitted within said second member for relative sliding-rotation so that said $Cr_2O_3$ makes bearing contact with said Cu.
8. The invention according to claim 7 in which:

said bearing contact between said $Cr_2O_3$ and Cu is grease lubricated.

9. The invention according to claim 1 in which the Ti is in an alloy selected from the group consisting by weight of: 85% Ti, 10% V, 2% Fe, and 3% Al; 90% Ti, 6% Al, and 4% V; 86% Ti, 6% Al, 6% V, and 2% Sn; and any common Ti base alloy in which the Ti weight is at least 70%.

10. A combination of a sliding-rotation contact race and bearing for use as a landing gear trunnion bearing on large aircraft to receive high shock loads without a permanently fixed lubricant between or in the race and bearing, comprising:

a generally ring-shaped race member;

a generally ring-shaped bearing member fitted for relative sliding-rotation within said race member;

one of said members being at least 80% by weight Cu and the other of said members being at least 70% by weight Ti;

said members having lubricated contact surfaces for said sliding-rotation, the member being at least 70% Ti having its lubricated contact surface being plasma-spray coated with $Cr_2O_3$, the $Cr_2O_3$ being mechanically bonded to the Ti.

11. The invention according to claim 10 in which:

said bearing member has its contact surface having an outer spherical circumferential bearing surface;

said race member having complementary spherical surfaces to receive the spherical surface of said bearing member.

12. The invention according to claim 10 in which the Cu is in an alloy selected from the group consisting of:

aluminum bronze containing by weight 91% Cu, 7% Al, and 2% Fe;

aluminum nickel bronze containing by weight about 81% to 88% Cu, about 9% to 15% Al, and 4% Ni; and beryllium-copper containing by weight 98% Cu, 2% Be, and traces of Fe and Ni.

13. The invention according to claim 10 in which the Ti is in an alloy selected from the group consisting by weight of: 85% Ti, 10% V, 2% Fe, and 3% Al; 90% Ti, 6% Al, and 4% V; and 86% Ti, 6% Al, 6% V, and 2% Sn.

14. A sliding-rotation contact journal bearing and race having the capability to receive high loads relative to bearing and race weight and having the capability to withstand high shock loads, without a permanently fixed lubricant between or in the race or bearing, comprising:

a ring-shaped bearing being at least 70% by weight Ti;

said bearing having an outer circumferential bearing surface plasma-spray coated with $Cr_2O_3$, the $Cr_2O_3$ being mechanically bonded to the Ti;

a generally ring-shaped race being at least 80% by weight Cu;

said race having an inner generally circumferential surface complementary to the coated surface on said a second bearing member containing a sufficient amount of Cu by weight to form a heavy duty bearing member;

said first member having surface coated with plasma-sprayed $Cr_2O_3$, the $Cr_2O_3$ coating being bonded mechanically to the Ti;

said $Cr_2O_3$ coating being in sliding-rotation bearing contact with a surface of said Cu.

15. The invention according to claim 14 in which the Ti is in an alloy selected from the group consisting by weight of: 85% Ti, 10%V, 2% Fe, and 3% Al; 90% Ti, 6% Al, and 4% V; and 86% Ti, 6% Al, 6% V, and 2% Sn.

16. The invention according to claim 14 in which the Cu is in an alloy selected from the group consisting of:

aluminum bronze containing by weight 91% Cu, 7% Al, and 2% Fe;

aluminum nickel bronze containing by weight about 81% to 88% Cu, about 9% to 15% Al, and 4% Ni; and beryllium-copper containing by weight 98% Cu, 2% Be, and traces of Fe and Ni.

17. The invention according to claim 14 in which:

said coated bearing surface on said bearing being convexly spherical and said complementary surface in said race being concavely spherical.

18. The invention according to claim 17 in which:

said race having a pair of diametrically spaced and aligned slots on one side, opening inwardly from adjacent an outer circumference of the race to a central opening in the race;

said slots being of greater width than said bearing ring and the diametrical space between the outer bottoms of the slots being greater than the outer diameter of the bearing;

whereby when a plane perpendicular the centerline of the bearing is substantially perpendicular to a plane perpendicular to the centerline of the race, the bearing can be inserted into the race and rotated 90°0 to fit and be locked therein to make sliding bearing contact with the race.

* * * * *

UNITED STATES PATENT AND TRADEMARK OFFICE
CERTIFICATE OF CORRECTION

PATENT NO. : 4,848,934
DATED : July 18, 1989
INVENTOR(S) : L. A. Blakely, R. R. Boyer, and L. B. Dalzell It is certified that error appears in the above-identified patent and that said Letters Patent is hereby corrected as shown below:

Column 1, line 52, "allow" should be -- alloy --.

Column 6, bottom line, far right, under the column entitled, "Comments", add -- minor coating pitting --.

Claim 4, column 8, delete lines 40 through 45, and insert -- at least 80%. --.

Claim 14, column 10, delete lines 11 through 18, and after "said" in line 10, insert:

-- bearing;
said bearing being fitted within said race so that said complementary surfaces are positioned for relative sliding-rotation so that said $Cr_2O_3$ makes bearing contact with said inner circumferential Cu, said last Cu and said $Cr_2O_3$ being grease lubricated. --

Claim 18, column 10, line 50, "90°0" should be -- 90° --.

Signed and Sealed this

Twelfth Day of November, 1991

Attest:

HARRY F. MANBECK, JR.

*Attesting Officer*     *Commissioner of Patents and Trademarks*